United States Patent
Hirschmann et al.

(10) Patent No.: US 7,378,800 B2
(45) Date of Patent: May 27, 2008

(54) STARTING APPARATUS FOR A HIGH-PRESSURE DISCHARGE LAMP AND HIGH-PRESSURE DISCHARGE LAMP HAVING A STARTING APPARATUS AND OPERATING METHOD FOR A HIGH-PRESSURE DISCHARGE LAMP

(75) Inventors: Günther Hirschmann, München (DE); Bernhard Sießegger, München (DE)

(73) Assignee: Patent-Treuhand-Gessellschaft für Elektrische Glühlampen mbH, Munich (DE)

( * ) Notice: Subject to any disclaimer, the term of this patent is extended or adjusted under 35 U.S.C. 154(b) by 0 days.

(21) Appl. No.: 11/251,885

(22) Filed: Oct. 18, 2005

(65) Prior Publication Data

US 2006/0087251 A1   Apr. 27, 2006

(30) Foreign Application Priority Data

Oct. 27, 2005   (DE) ...................... 10 2004 052 299

(51) Int. Cl.
*H01J 13/28* (2006.01)
*H05B 37/00* (2006.01)

(52) U.S. Cl. ...................................... 315/109; 315/206
(58) Field of Classification Search ................ 315/109, 315/124, 141, 142, 168, 203, 204, 206
See application file for complete search history.

(56) References Cited

U.S. PATENT DOCUMENTS

| | | | |
|---|---|---|---|
| 2,508,114 A * | 5/1950 | Jenne, Jr. .................... 313/601 |
| 3,727,089 A * | 4/1973 | Chow ........................... 315/238 |
| 4,749,914 A * | 6/1988 | Feher et al. ................. 315/246 |
| 5,990,633 A | 11/1999 | Hirschmann et al. ....... 315/289 |
| 6,084,360 A * | 7/2000 | Yokokawa et al. ......... 315/287 |
| 6,104,141 A | 8/2000 | Ganser et al. ........ 315/209 PZ |
| 6,184,635 B1 * | 2/2001 | Boenigk ..................... 315/291 |
| 6,323,604 B1 * | 11/2001 | Boenigk et al. ............ 315/290 |
| 6,552,502 B2 * | 4/2003 | Okamoto et al. ........... 315/336 |
| 7,170,235 B2 * | 1/2007 | Van Casteren .............. 315/224 |
| 2003/0173912 A1 * | 9/2003 | Huber et al. ................. 315/291 |
| 2005/0184678 A1 * | 8/2005 | Rupp et al. ........... 315/209 PZ |
| 2007/0138972 A1 * | 6/2007 | Siessegger ................... 315/225 |

FOREIGN PATENT DOCUMENTS

DE        0 294 604 A1    5/1988

* cited by examiner

*Primary Examiner*—Douglas W. Owens
*Assistant Examiner*—Minh Dieu A
(74) *Attorney, Agent, or Firm*—Carlo S. Bessone

(57) ABSTRACT

A starting apparatus for a high-pressure discharge lamp provided with an auxiliary starting electrode, has a series resonant circuit for the purpose of generating the starting voltage for the high-pressure discharge lamp. The resonant inductance of the series resonant circuit includes the primary winding of a transformer, whose secondary winding is provided for the purpose of applying the starting voltage to the auxiliary starting electrode (Z) of the high-pressure discharge lamp. The invention also relates to a high-pressure discharge lamp, in particular to a vehicle headlight lamp, having such a starting apparatus arranged in the lamp base.

4 Claims, 3 Drawing Sheets

Figure 1:
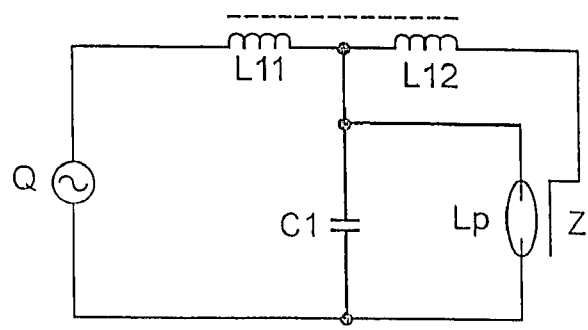

STARTING APPARATUS FOR A HIGH-PRESSURE DISCHARGE LAMP AND HIGH-PRESSURE DISCHARGE LAMP HAVING A STARTING APPARATUS AND OPERATING METHOD FOR A HIGH-PRESSURE DISCHARGE LAMP

I. TECHNICAL FIELD

The invention relates to a starting apparatus for a high-pressure discharge lamp provided with an auxiliary starting electrode, the starting apparatus having a series resonant circuit for the purpose of generating the starting voltage for the high-pressure discharge lamp and to a high-pressure discharge lamp having such a starting apparatus and to an operating method for a high-pressure discharge lamp.

II. BACKGROUND ART

EP-A 0 294 604 describes a circuit arrangement for the purpose of operating a vehicle headlight high-pressure discharge lamp having a sinusoidal AC voltage. The circuit arrangement comprises a series resonant circuit which generates a sinusoidal AC voltage having a frequency of 45 kilohertz and an amplitude of up to 18 000 volts for the purpose of starting the gas discharge in the high-pressure discharge lamp at the resonant capacitor by means of the resonant peak method, and this sinusoidal AC voltage starts the lamp within a time span of 6 milliseconds.

III. DISCLOSURE OF THE INVENTION

The object of the invention is to provide a starting apparatus for a high-pressure discharge lamp provided with an auxiliary starting electrode, said starting apparatus being suitable for operation of the high-pressure discharge lamp using a radiofrequency alternating current and having a design which is simpler than that in the prior art.

This object is achieved according to the invention by a starting apparatus for a high-pressure discharge lamp provided with an auxiliary starting electrode, the starting apparatus having a series resonant circuit for the purpose of generating the starting voltage for the high-pressure discharge lamp, wherein the resonant inductance of the series resonant circuit comprises the primary winding of a transformer, whose secondary winding is provided for the purpose of applying the starting voltage to the auxiliary starting electrode of the high-pressure discharge lamp. Particularly advantageous embodiments of the invention are described in the dependent patent claims.

The starting apparatus according to the invention for a high-pressure discharge lamp provided with an auxiliary starting electrode has a series resonant circuit for the purpose of generating the starting voltage for the high-pressure discharge lamp, the resonant inductance of said series resonant circuit comprising the primary winding of a transformer, the secondary winding of this transformer being provided for the purpose of applying the starting voltage to the auxiliary starting electrode of the high-pressure discharge lamp. As a result, for AC voltages having high frequencies, in particular for frequencies in the megahertz range, a voltage can be generated in the primary winding of the transformer during the starting phase of the high-pressure discharge lamp in a simple manner, said voltage having been increased by resonance above the supply voltage of the starting apparatus, being transformed up to the necessary starting voltage of the lamp by means of the secondary winding of the transformer and being supplied to the auxiliary starting electrode of the high-pressure discharge lamp. In order to deactivate the starting apparatus once the gas discharge in the high-pressure discharge lamp has been started successfully, it is sufficient to alter the frequency of the supply voltage for the starting apparatus and the high-pressure discharge lamp such that there is a sufficient difference in frequency from the resonant frequency of the abovementioned series resonant circuit. Correspondingly, the starting apparatus according to the invention has a simple design. In addition, the secondary winding of the transformer does not have the radiofrequency lamp current flowing through it during lamp operation, with the result that no notable power losses can occur in the secondary winding. Moreover, the starting apparatus according to the invention makes it possible for there to be full DC isolation between the starting apparatus and its voltage supply circuit or the operating circuit of the high-pressure discharge lamp.

In order to bring about the abovementioned DC isolation, the resonant capacitance of the series resonant circuit is advantageously formed by at least two capacitors which are connected such that they prevent a direct current flow between the voltage supply circuit and the components of the starting apparatus.

In accordance with a few preferred exemplary embodiments of the invention, a DC voltage isolating capacitor is advantageously also provided in order to reduce the sodium loss in the discharge plasma owing to the diffusion of sodium ions to the discharge vessel wall. The capacitance of the DC voltage isolating capacitor is in this case dimensioned such that, on the one hand, the auxiliary starting electrode has a voltage applied to it which is sufficiently high for starting the gas discharge and, on the other hand, the abovementioned sodium diffusion is reduced to a sufficient degree. In the event of the DC voltage isolating capacitor having a capacitance which is too high or a leakage current which is too high, insufficient reduction in the sodium diffusion is achieved and, in the event of a capacitance which is too low, the auxiliary starting electrode cannot have a voltage applied to it which is sufficiently high for starting the gas discharge.

The transformer of the starting apparatus according to the invention is advantageously in the form of an autotransformer, i.e. the transformer has only a single winding having a first winding section which is in the form of a primary winding and a second winding section which is in the form of a secondary winding, one terminal of these winding sections being in the form of a common terminal. As a result, a space-saving arrangement of the transformer and the starting apparatus can be ensured, with the result that the complete starting apparatus can be integrated in the lamp base of the high-pressure discharge lamp. Moreover, the winding(s) of the transformer of the starting apparatus according to the invention is/are preferably in the form of (a) chamber-wound or cross-wound directional multi-layer winding(s) in order to ensure a natural resonant frequency of the transformer which is as high as possible.

The operating method according to the invention for a high-pressure discharge lamp is characterized by the fact that a resonant peak of the AC voltage is provided for the purpose of starting the gas discharge in the discharge vessel of the high-pressure discharge lamp, the resonant peak of the AC voltage being generated with the aid of a transformer and being transformed into a higher voltage which is supplied to an auxiliary starting electrode of the high-pressure discharge lamp. As a result, with substantially low complexity, the required starting voltage for the high-pressure discharge lamp can be generated since, in contrast to the prior art, the voltage to be provided using the resonant peak method is now only a fraction of the high voltage required across the auxiliary starting electrode. The resonant peak of the AC voltage is preferably generated by means of the primary winding of the transformer, said primary winding being formed as part of a series resonant circuit, and the higher voltage supplied to the auxiliary starting electrode is generated with the aid of the secondary winding of the transformer. In addition, frequency modulation of the supply voltage generated by the voltage source is preferably carried out for the purpose of providing the resonant peak of the AC voltage, in order to take into account changes in the resonant frequency of the abovementioned series resonant circuit owing to component tolerances, temperature fluctuations and ageing of the components.

Once the gas discharge in the high-pressure discharge lamp has been started, an impedance, which is connected in series with the discharge path of the high-pressure discharge lamp, for example, the primary winding of the abovementioned transformer, is advantageously used for the purpose of stabilizing the gas discharge. The abovementioned series resonant circuit can advantageously also be used once the gas discharge in the high-pressure discharge lamp has been started in order to set the electrical power consumption of the high-pressure discharge lamp to the desired value by altering the frequency of the supply voltage of said high-pressure discharge lamp.

IV. BRIEF DESCRIPTION OF THE DRAWINGS

Figure 2:
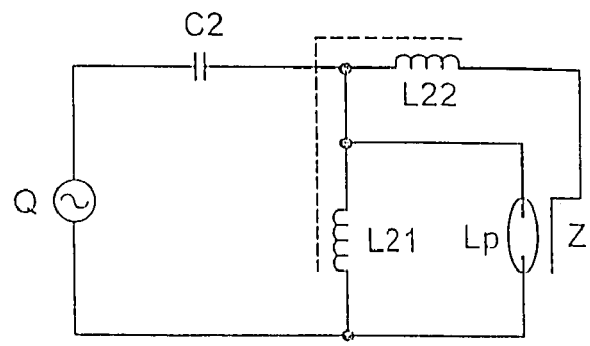
Figure 3:
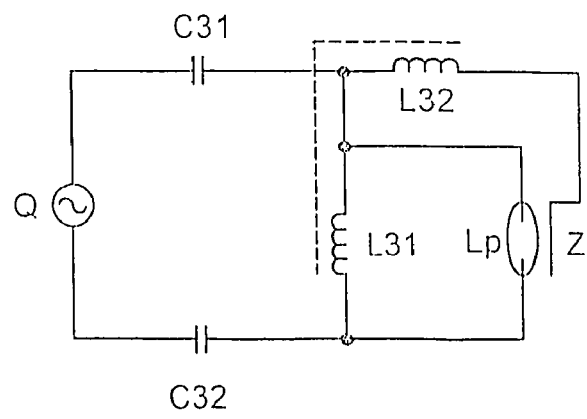
Figure 4:
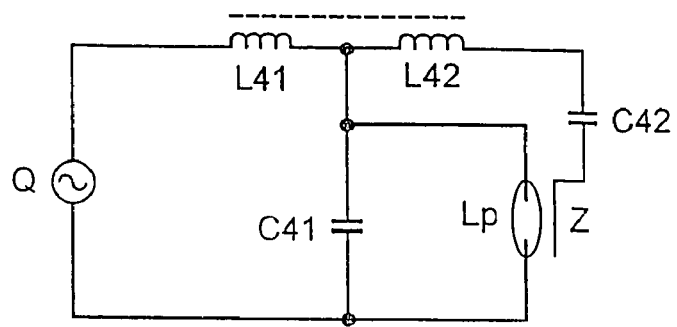
Figure 5:
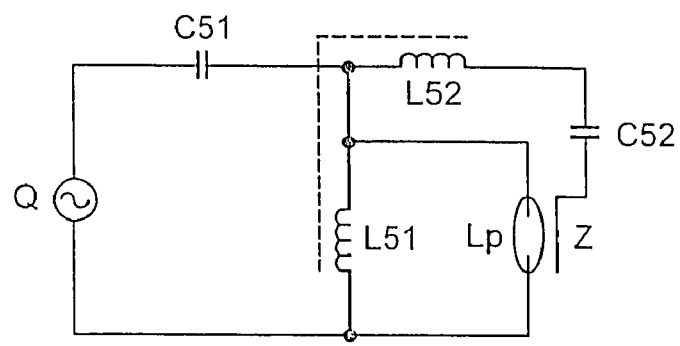
Figure 6:
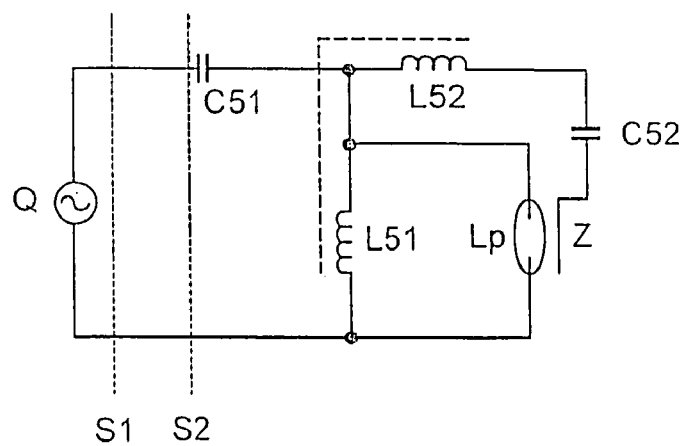
Figure 7:
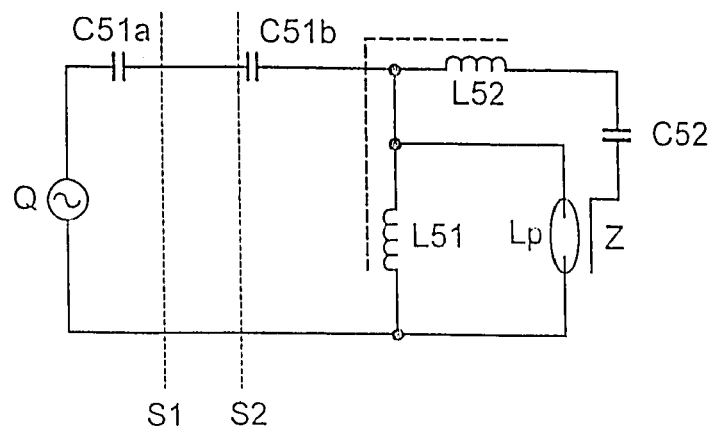
Figure 8:
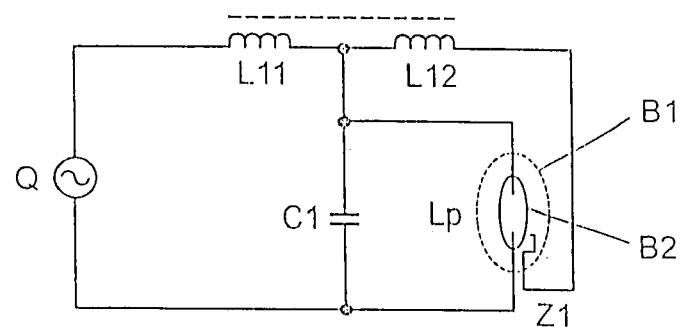
Figure 9:
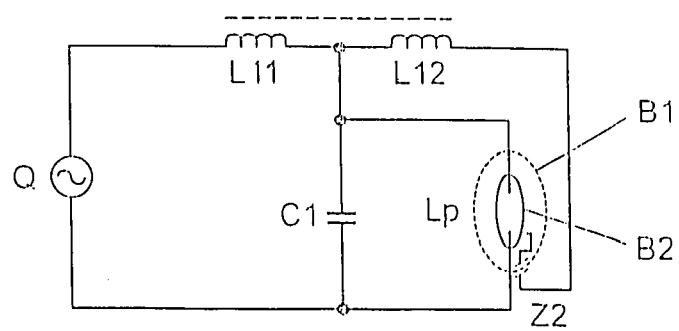

The invention will be explained in more detail below with reference to several preferred exemplary embodiments. In the drawings:

FIG. 1 shows a circuit diagram of the starting apparatus in accordance with the first exemplary embodiment of the invention, FIG. 2 shows a circuit diagram of the starting apparatus in accordance with the second exemplary embodiment of the invention, FIG. 3 shows a circuit diagram of the starting apparatus in accordance with the third exemplary embodiment of the invention, FIG. 4 shows a circuit diagram of the starting apparatus in accordance with the fourth exemplary embodiment of the invention, FIG. 5 shows a circuit diagram of the starting apparatus in accordance with the fifth exemplary embodiment of the invention, FIG. 6 shows a circuit diagram of the starting apparatus in accordance with the fifth exemplary embodiment of the invention with assignment of the components to the lamp base, FIG. 7 shows a circuit diagram of the starting apparatus in accordance with the sixth exemplary embodiment of the invention, FIG. 8 shows a circuit diagram of the starting apparatus in accordance with the first exemplary embodiment of the invention having an auxiliary starting electrode in accordance with a first embodiment, and FIG. 9 shows a circuit diagram of the starting apparatus in accordance with the first exemplary embodiment of the invention having an auxiliary starting electrode in accordance with a second embodiment.

V. BEST MODE FOR CARRYING OUT THE INVENTION

The starting apparatuses illustrated schematically in FIGS. 1 to 9 serve the purpose of applying the starting voltage required for the high-pressure discharge lamp Lp to the auxiliary starting electrode Z or Z' of said high-pressure discharge lamp Lp. The starting apparatuses are in each case supplied by an AC voltage source Q or Q' which generates, for example, a sinusoidal or square-wave supply voltage or a 'sinusoidal or square-wave supply current.

The exemplary embodiment of the starting apparatus according to the invention illustrated schematically in FIG. 1 comprises an autotransformer L11, L12 and a capacitor C1. The autotransformer has a winding having a first winding section L11, which is in the form of a primary winding, and having a second winding section L12 which is in the form of a secondary winding of the transformer. The capacitor C1 and the primary winding section L11 are connected as a series resonant circuit which is connected to the AC voltage source Q. The resonant frequency of the series resonant circuit is preferably selected to be above 300 KHz, in particular above 1 MHz, which results in a small physical size and a particularly low voltage required across the auxiliary starting electrode. During the starting phase, the frequency of the supply voltage or the supply current is selected to be close to the resonant frequency of the series resonant circuit or is selected such that a harmonic of the supply signal leads to excitation of the series resonant circuit during the starting phase.

The center tap between the two winding sections L11, L12 is in the form of a common, first terminal of the winding sections L11, L12 and is connected both to the first electrode of the high-pressure discharge lamp Lp and to a terminal of the capacitor C1. The second terminal of the primary winding section L11 is connected to the AC voltage source Q, while the second terminal of the secondary winding section L12 is connected to the auxiliary starting electrode Z of the high-pressure discharge lamp Lp. The capacitor C1 is connected in parallel with the discharge path of the lamp Lp. The lamp Lp is, for example, a mercury-free metal halide high-pressure discharge lamp which is provided as the light source in a vehicle headlight. The discharge vessel of this high-pressure discharge lamp Lp is either made from a translucent ceramic, for example from aluminum oxide ceramic, or from quartz glass. The auxiliary starting electrode Z is, for example, applied as an electrically conductive coating to the outside of the discharge vessel or is in the form of a wire such that there is a capacitive coupling between the auxiliary starting electrode Z and at least one of the two electrodes of the high-pressure discharge lamp Lp arranged within the discharge vessel. The resonant capacitor Cl has a capacitance of 94 pF (measured at a frequency of 1 KHz). The primary winding section L11 has 70 turns and an inductance of 100 µH (measured at a frequency of 1 KHz). The secondary winding section L12 has 95 turns.

In order to operate the abovementioned high-pressure discharge lamp having a ceramic discharge vessel, an AC voltage source Q is used which has a virtually sinusoidal AC voltage having an rms value of 90 V and a frequency of 1248 MHz, which corresponds to the empirically determined resonant frequency of the resonant circuit formed from the components used. The AC voltage source Q is a voltage converter, for example a push-pull converter, which generates the desired AC voltage from the vehicle system voltage of the motor vehicle. In order to start the gas discharge in the high-pressure discharge lamp Lp, the frequency of the AC voltage provided by the AC voltage source Q is matched to the resonant frequency of the series resonant circuit C1, L11, with the result that a resonant peak of the AC voltage having a peak value of more than 1000 volts is built up across the components C1 and L11. This voltage is also applied to the discharge path between the two electrodes of the high-pressure gas discharge lamp Lp since the resonant capacitor C1 is connected in parallel with the discharge path of the lamp Lp. By means of the secondary winding section L12, the resonant peak of the AC voltage is transformed up to a peak value of 2500 volts and supplied to the auxiliary starting electrode Z. There is therefore a voltage difference of 2500 volts between the auxiliary starting electrode Z and the electrode of the high-pressure discharge lamp Lp which is connected to the AC voltage source Q and a terminal of the resonant capacitor C1, and this voltage difference is sufficient for starting the gas discharge in the lamp Lp. Once the gas discharge in the high-pressure discharge lamp Lp has been started, the starting apparatus is automatically deactivated since the high-pressure discharge lamp then severely damps the resonant circuit. The frequency of the AC voltage generated by the AC voltage source Q is increased to such an extent that the desired lamp power is set. During operation of the high-pressure discharge lamp Lp, the primary winding section L11 is used for the purpose of stabilizing the discharge, i.e. for the purpose of limiting the lamp current.

In order to operate the abovementioned high-pressure discharge lamp Lp having a discharge vessel made from quartz glass, an AC voltage source Q is used which has a virtually sinusoidal AC voltage having an rms value of 195 V and a frequency of 1234 MHz. In order to start the gas discharge in the high-pressure discharge lamp Lp, the frequency of the AC voltage provided by the AC voltage source Q is matched to the resonant frequency of the series resonant circuit C1, L11, such that a resonant peak of the AC voltage having a peak value of 1500 volts is built up across the components C1 and L11. This voltage is also applied to the discharge path between the two electrodes of the high-pressure gas discharge lamp Lp since the resonant capacitor C1 is connected in parallel with the discharge path of the lamp Lp. By means of the secondary winding section L12, an AC voltage having a peak value of 4000 volts is supplied to the auxiliary starting electrode Z. There is therefore a voltage difference of 4000 volts between the auxiliary starting electrode Z and the electrode of the high-pressure discharge lamp Lp which is connected to the AC voltage source Q and a terminal of the resonant capacitor C1, and this voltage difference is sufficient, together with the voltage difference between the electrodes, for starting the gas discharge in the lamp Lp. Once the gas discharge in the high-pressure discharge lamp Lp has been started, the starting apparatus is automatically deactivated since the high-pressure discharge lamp then severely damps the resonant circuit. The frequency of the AC voltage generated by the AC voltage source Q is increased to such an extent that the desired lamp power is set. During operation of the high-pressure discharge lamp Lp, the primary winding section L11 is used for the purpose of stabilizing the discharge, i.e. for the purpose of limiting the lamp current.

In order to ensure that, during the starting phase, the frequency of the AC voltage generated by the AC voltage source is sufficiently close to the resonant frequency of the series resonant circuit which has a very narrow band owing to its high magnification factor, frequency modulation of the AC voltage can be carried out during the starting phase. At a mid-frequency of 1.23 MHz, for example, a frequency deviation of 50 KHz and a sinusoidal modulation signal at 500 Hz are suitable for this purpose.

In the second exemplary embodiment of the starting apparatus according to the invention depicted in FIG. 2, the starting apparatus comprises an autotransformer L21, L22 and a capacitor C2. The autotransformer has a winding having a first winding section L21, which is in the form of a primary winding, and having a second winding section L22 which is in the form of a secondary winding of the transformer. The capacitor C2 and the primary winding section L21 are connected in the form of a series resonant circuit which is connected to the AC voltage source Q. The center tap between the two winding sections L21, L22 is in the form of a common, first terminal of the winding sections L21, L22 and is connected both to the first electrode of the high-pressure discharge lamp Lp and to a terminal of the capacitor C2. The second terminal of the primary winding section L21 is connected to the AC voltage source Q and to the second electrode of the high-pressure discharge lamp, while the second terminal of the secondary winding section L22 is connected to the auxiliary starting electrode Z of the high-pressure discharge lamp Lp. In contrast to the first exemplary embodiment (FIG. 1), in the second exemplary embodiment the primary winding section L21 and not the resonant capacitor C2 is connected in parallel with the discharge path of the high-pressure discharge lamp Lp. The winding sections L21, L22 and the resonant capacitor C2 have the same dimensions as the corresponding components L11, L12 and C1 from the first exemplary embodiment. The AC voltage source Q and the lamp Lp likewise correspond to the first exemplary embodiment. The capacitor C2 also prevents a direct current flow through the lamp Lp. The resonant capacitor C2 has a capacitance of 94 pF. The primary winding section L21 has 70 turns and an inductance of 100 µH. The secondary winding section L22 has 95 turns.

In order to start the gas discharge in the lamp Lp, the frequency of the AC voltage generated by the AC voltage source Q is increased linearly from 1.2 MHz to 1.3 MHz within 1 millisecond and is then reduced to 1.2 MHz again within the same time span in order to ensure that the resonant frequency, lying in this frequency range, of the series resonant circuit C2, L21 is met sufficiently well. This procedure is repeated until the gas discharge in the lamp Lp has been started or a predetermined maximum time span, for example 100 ms, has been exceeded and the AC voltage source Q is switched off. Once the gas discharge in the lamp Lp has been started, the frequency of the AC voltage is increased until the desired lamp power is set.

FIG. 3 illustrates a third exemplary embodiment of the starting apparatus according to the invention. The third exemplary embodiment largely corresponds to the starting apparatus in accordance with the second exemplary embodiment. In contrast to the second exemplary embodiment, in the third exemplary embodiment of the starting apparatus according to the invention the resonant capacitance of the series resonant circuit of the starting apparatus is formed by two capacitors C31 and C32. The two resonant capacitors C31, C32 are connected such that there is full potential isolation between the AC voltage source Q and the components of the starting apparatus and the lamp Lp. The capacitor C31 has a capacitance of 235 pF, and the capacitor C32 has a capacitance of 157 pF. The dimensions and arrangement of the components L31, L32, Q, Lp and Z correspond to the dimensions and arrangement of the components L21, L22, Q, Lp and Z from the second exemplary embodiment (cf. FIG. 2). The mode of operation likewise corresponds to that in the second exemplary embodiment.

The fourth exemplary embodiment of the starting apparatus according to the invention illustrated in FIG. 4 differs from the first exemplary embodiment only by the additional DC voltage isolating capacitor C42 which is connected between the high-voltage output of the secondary winding section L42 and the auxiliary starting electrode Z of the high-pressure discharge lamp Lp. The primary winding section L41 of the autotransformer L41, L42 and the capacitor C41 form a series resonant circuit which is connected to the AC voltage source Q. The resonant capacitor C41 is connected in parallel with the discharge path of the high-pressure discharge lamp Lp. The center tap between the primary winding section L41 and the secondary winding section L42 is connected to the capacitor C41 and to the first electrode of the high-pressure discharge lamp Lp. The other terminal of the secondary winding section L42 is connected to the auxiliary starting electrode Z via the capacitor C42. The second electrode of the lamp Lp is connected to the capacitor C41 and to the AC voltage source Q. The capacitor C42 prevents a direct current flow between the auxiliary starting electrode and the first and second electrode of the high-pressure discharge lamp Lp. The capacitance of the capacitor C42 can be freely selected within wide limits without exerting a notable influence on the starting operation. The capacitor C42 is preferably dimensioned such that the voltage drop across the capacitor C42 is smaller during the starting operation than the voltages which are set between the auxiliary starting electrode Z and the two electrodes of the high-pressure discharge lamp Lp. Very low capacitance values are therefore sufficient for the capacitor C42, for example 33 pF. However, markedly larger values are also possible for the capacitance of the capacitor C42, such as 10 nF. Otherwise, the mode of operation of this exemplary embodiment corresponds to that in the first exemplary embodiment.

The fifth exemplary embodiment illustrated in FIG. 5 largely corresponds to the second exemplary embodiment of the invention depicted in FIG. 2. It differs from the second exemplary embodiment only by the additional DC voltage isolating capacitor C52 which is connected between the auxiliary starting electrode Z and the high-voltage terminal of the secondary winding section L52. The capacitor C51 and the primary winding section L51 of the autotransformer L51, L52 form a series resonant circuit which is connected to the AC voltage source Q. The primary winding section L51 is connected in parallel with the discharge path of the high-pressure discharge lamp Lp. The arrangement and dimensions of the components L51, L52, C51, Q, Lp and Z correspond to the arrangement and dimensions of the components L21, L22, C2, Q, Lp and Z from the second exemplary embodiment (FIG. 2) of the invention. The mode of operation likewise corresponds to that in the second exemplary embodiment of the invention.

FIG. 6 is a schematic illustration of the physical division of the components of the starting apparatus in accordance with the fifth exemplary embodiment (FIG. 5). The components C51, L51, L52 and C52 of the starting apparatus are accommodated in the lamp base of the high-pressure discharge lamp Lp. The electrical terminals S2 of the high-pressure discharge lamp Lp or of the starting apparatus are connected to the electrical terminals S1 of the AC voltage source Q by means of cables.

FIG. 7 is a schematic illustration of an alternative physical division of the resonant capacitance of the series resonant circuit of the starting apparatus according to the invention. The resonant capacitance in this case comprises the two series-connected capacitors C51a and C51b. The capacitors C51a, C51b and the primary winding section L51 of the autotransformer L51, L52 in this case form a series resonant circuit which is connected to the AC voltage source Q. The capacitors C51a, C51b in this case replace the capacitor C51 in accordance with the fifth exemplary embodiment illustrated in FIGS. 5 and 6. The capacitor C51a is formed as part of the AC voltage source or of the ballast Q of the lamp Lp, while the capacitor C51b is accommodated, formed as part of the starting apparatus and together with the other components of the starting apparatus, in the lamp base of the lamp Lp. In all other details the exemplary embodiment illustrated in FIG. 7 corresponds to the fifth exemplary embodiment depicted in FIGS. 5 and 6. For identical components, the same references have therefore been used in FIGS. 5, 6 and 7.

FIGS. 8 and 9 again illustrate the starting apparatus in accordance with the first exemplary embodiment of the invention and having the high-pressure discharge lamp Lp. The lamp Lp is in this case provided with differently designed auxiliary starting electrodes Z1, and Z2, however. The same references have therefore been used for identical components in FIGS. 1, 8 and 9.

In the high-pressure discharge lamp Lp illustrated schematically in FIG. 8, the auxiliary starting electrode Z1 is in the form of a wire which protrudes into the interior of the outer bulb B1 and bears against the outside of the discharge vessel B2. The auxiliary starting wire Z1 is capacitively coupled to one of the electrodes arranged within the discharge vessel B2 of the high-pressure discharge lamp Lp, is passed out of the outer bulb B1 via a seal, for example a pinch seal, and makes contact with the high-voltage terminal of the secondary winding section L12.

In the high-pressure discharge lamp Lp illustrated schematically in FIG. 9, the auxiliary starting electrode Z1 largely comprises a spring metal sheet which is arranged in the interior of the outer bulb B1 and is coupled capacitively to one of the electrodes arranged within the discharge vessel B2. The spring metal sheet comes into contact with a metallic layer on the inside of the outer bulb B2 which in turn is capacitively coupled to a second coating on the outside of the outer bulb B1. The two metallic coatings on the inside and outside of the outer bulb B1 lie opposite one another and form a capacitor in which the material or glass of the outer bulb forms the dielectric. This capacitor corresponds to the DC voltage isolating capacitor C52. The metallic coating on the outside of the outer bulb B1 is connected to the high-voltage terminal of the secondary winding section L12.

What is claimed is:

1. A starting apparatus for a high-pressure discharge lamp (LP) provided with an auxiliary starting electrode (Z), the starting apparatus having a series resonant circuit for generating a starting voltage for the high-pressure discharge lamp (LP), wherein a resonant inductance of the series resonant circuit comprises a primary winding section (L41) of a transformer, a secondary winding section (L42) of the transformer applies the starting voltage to the auxiliary starting electrode (Z) of the high-pressure discharge lamp (LP), characterized in that once a gas discharge in the high-pressure discharge lamp has been started, an impedance of the series resonant circuit connected in series with a discharge path of the high-pressure discharge lamp stabilizes the gas and a DC voltage isolation capacitor (C42) is provided in series with the secondary winding section (L42) and the auxiliary starting electrode (Z).

2. The starting apparatus of claim 1, characterized in that a resonant capacitor of the series resonant circuit is formed by at least two capacitors (C31, C32) which cause a voltage isolation of the starting apparatus from a voltage supply circuit (Q).

3. A high-pressure discharge lamp (LP) having an auxiliary starting electrode (Z), a lamp base and a starting apparatus arranged in the lamp base, the starting apparatus provided with a series resonant circuit for generating a starting voltage for the high-pressure discharge lamp (LP), wherein a resonant inductance of the series resonant circuit comprises a primary winding section (L41) of a transformer, a secondary winding section (L42) of the transformer applies the starting voltage to the auxiliary starting electrode (Z) of the high-pressure discharge lamp (LP), characterized in that once a gas discharge in the high-pressure discharge lamp has been started, an impedance of the series resonant circuit connected in series with a discharge path of the high-pressure discharge lamp stabilizes the gas and a DC voltage isolation capacitor (C42) is provided in series with the secondary winding section (L42) and the auxiliary starting electrode (Z).

4. The high-pressure discharge lamp of claim 3 further including an outer bulb (B1) surrounding the discharge vessel (B2), the DC voltage isolation capacitor is formed by electrically conductive coatings on the interior and outside of the outer bulb (B1), the material of the outer bulb (B1) serves as a dielectric.

* * * * *